United States Patent [19]

Sergel et al.

[11] Patent Number: 5,129,802
[45] Date of Patent: Jul. 14, 1992

[54] APPARATUS FOR VULCANIZING PNEUMATIC VEHICLE TIRES

[75] Inventors: Horst Sergel, Hanover; Klaus Hoops, Langenhagen; Klaus Hanebuth, Wunstorf; Heinrich Nädler, Neustadt, all of Fed. Rep. of Germany

[73] Assignee: Continental Aktiengesellschaft, Hanover, Fed. Rep. of Germany

[21] Appl. No.: 579,276

[22] Filed: Sep. 5, 1990

Related U.S. Application Data

[63] Continuation of Ser. No. 303,822, Jan. 30, 1989, abandoned.

[30] Foreign Application Priority Data

Jan. 30, 1988 [DE] Fed. Rep. of Germany ....... 3802777

[51] Int. Cl.$^5$ .................................................. B29C 35/04
[52] U.S. Cl. .......................................... 425/36; 425/38; 425/39; 425/48; 425/52; 425/58
[58] Field of Search ................ 425/22, 23, 25, 36, 425/38, 48, 52, 58, 32, 39, 33, 173; 264/315, 326

[56] References Cited

U.S. PATENT DOCUMENTS

| | | | |
|---|---|---|---|
| 3,396,221 | 8/1968 | Balle et al. | 425/52 X |
| 3,646,191 | 2/1972 | Zangl | 264/315 |
| 4,597,729 | 7/1986 | Singh et al. | 425/38 |
| 4,670,209 | 6/1987 | Nakagawa et al. | 425/52 X |
| 4,758,401 | 7/1988 | Rach et al. | 264/326 |

FOREIGN PATENT DOCUMENTS

3242241A1 5/1984 Fed. Rep. of Germany ........ 425/36
56-166040 12/1981 Japan .................................. 425/38

Primary Examiner—Jan H. Silbaugh
Assistant Examiner—Mathieu Vargot
Attorney, Agent, or Firm—Robert W. Becker & Associates

[57] ABSTRACT

An apparatus for vulcanizing a pneumatic vehicle tire, the beads of which, in a mounted state, are disposed on the radially inner periphery of a wheel rim. A tire blank, with the beads displaced laterally outwardly, is vulcanized using a heating press that is provided with two axially displaceable contour rings for forming the inner regions of the tire beads, and a heating bellows. To facilitate introduction of the tire blank and to protect the heating bellows, it is proposed, for loading the heating press, to axially move the contour rings together, into a position above a vulcanizing position, in such a way that the evacuated heating bellows moves downwardly through a space defined by the lower contour ring. The tire blank is subsequently placed over the contour rings, accompanied by a slight oval deformation of the lower tire bead, and is subsequently fixed on the contour rings by increasing the axial spacing therebetween. At the same time, the heating bellows passes into the interior of the blank. The tire blank is subsequently lowered and vulcanized.

9 Claims, 3 Drawing Sheets

APPARATUS FOR VULCANIZING PNEUMATIC VEHICLE TIRES

This application is a continuation of U.S. Ser. No. 303,822 filed Jan. 30, 1989, now abandoned.

BACKGROUND OF THE INVENTION

1. Field of the Invention

The present invention relates to an apparatus for vulcanizing a pneumatic vehicle tire, the tire beads of which, in a mounted state, are disposed on the radially inner periphery of a wheel rim. A tire blank "raw" tire or "green tire", with the tire beads being displaced laterally outwardly, is vulcanized using a heating press that is provided with conventional mold parts for the outer areas of the tire blank, two axially displaceable contour rings to form the inner regions of the tire beads, and a heating bellows.

2. Description of the Prior Art

An apparatus for vulcanizing tires of the aforementioned type in a position where the tire beads are displaced laterally outwardly is described in German Offenlegungsschrift 32 42 241 Huinink et al dated May 17, 1984 and belonging to the assignee of the present invention. This heretofore known apparatus is provided with two plates that are secured on a guide rod or on a tube and are movable relative to one another in the axial direction. The radially and axially outer rims of these plates are embodied in such a way that they permit a metallically smooth forming of the inner surface of the tire in the bead region. On the sides thereof that face one another, the two plates are provided with clamping rings for fixing the rims of the heating bellows, and the plates are configured in the radial direction in such a way that, in the moved-together state and radially inwardly of the clamping rings, the plates form an inner space that is large enough to accompany the heating bellows in a non-pressurized state thereof.

However, such a construction of a vulcanizing mold in principle has the drawback that due to the relatively great axial dimension of the moved-together plates, it is more difficult to mount a tire blank ("raw" tire/"green tire") or to remove the finished tire after vulcanization. A further weak point is the small inner space between the moved-together contour rings, resulting in the danger that the non-pressurized heating bellows cannot completely enter the inner space and can then be pinched when the plates are moved together. Even when the heating bellows does completely enter the inner space, it is folded or creased to such a great extent that this also can lead to a reduction of its service life.

It is therefore an object of the present invention to provide an apparatus for vulcanizing pneumatic vehicle tires of the aforementioned type, where the indicated danger to the heating bellows is eliminated, and introduction of the tire blank, "raw" tire or "green tire" is facilitated.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
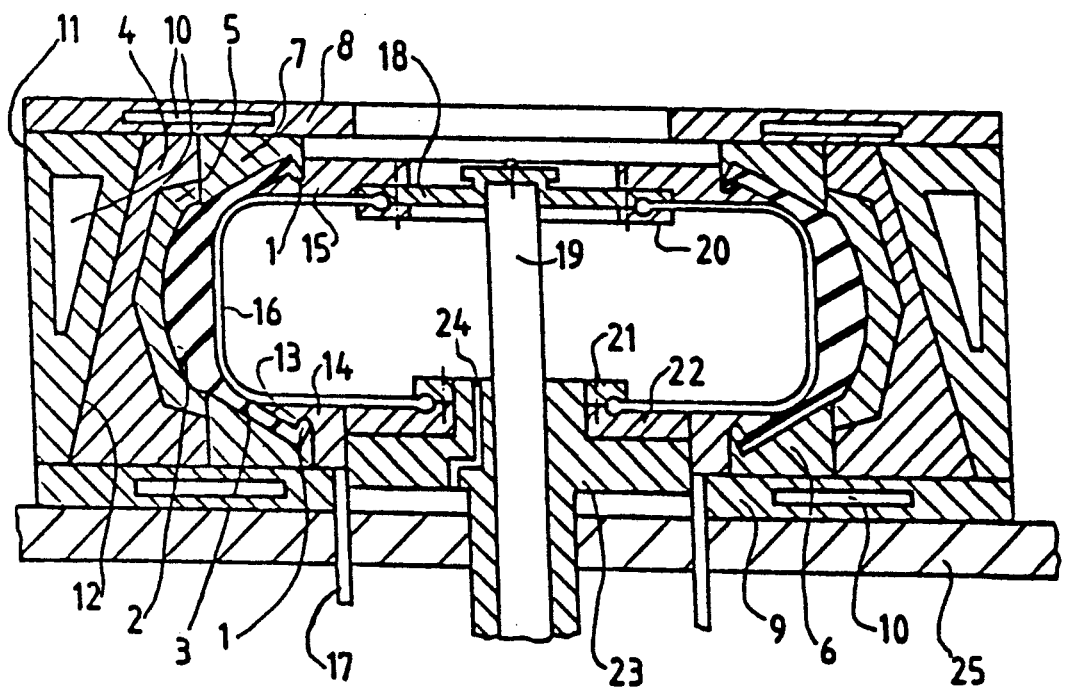
FIG. 1 is a vertical cross-sectional view taken parallel to the front side of one exemplary embodiment of the inventive vulcanizing apparatus in which a tire blank has been placed in the vulcanizing position.

The apparatus of the present invention is characterized primarily in that: to load the heating press, the contour rings are axially moved together, into a position above a vulcanizing position, in such a way that the heating bellows, in an evacuated or at least non-pressurized state, moves downwardly through a space defined by the lower contour ring; the tire blank is subsequently placed over the contour rings, accompanied by a slight oval deformation of a lower one of the tire beads; the tire blank is fixed on the contour rings by subsequently increasing the axial spacing between the contour rings in such a way that the tire beads are centered thereon, whereby the heating bellows simultaneously passes into the interior of the tire blank; the tire blank is subsequently lowered into the vulcanizing position; the heating mold is closed; and the tire blank is vulcanized by supplying heating medium to the mold and to the heating bellows.

The inventive apparatus for carrying out the present invention is characterized primarily in that: the upper contour ring and the upper heating bellows clamping means are directly or indirectly disposed on an upper end of an axially movable piston rod; an axially displaceable bladder or bellows head is provided on which is disposed the lower heating bellows clamping means; and support means are provided to which the lower contour ring is secured, with the support means and the bladder or bellows head being displaceable relative to one another.

The present invention offers the advantage that due to the small axial dimensions of the essentially annular disk-shaped contour rings, it is possible to mount the sensitive tire blank thereon without significant distortions, so that shifting of material and permanent deformations at the beads are avoided.

A further advantage is that the lower part of the heating bellows is no longer clamped to the lower contour ring but rather to a bladder or bellows head that is movable relative thereto. This, in conjunction with the fact that the lower contour ring has an annular disk-like configuration, which permits the heating bellows to exit downwardly, provides a protective handling of the heating bellows during all stages of the vulcanization process. The heating bellows no longer becomes folded and squeezed, so that its service life is increased considerably. This in turn means that it is seldom necessary to replace the heating bellows, and hence it is not necessary to shut down the heating press as frequently as was previously necessary.

Pursuant to one preferred embodiment of the present invention, fixing of the tire blank on the contour rings, and initiation of a first dishing or curving stage, is effected in a position in which none of the outer mold components rests against the tire blank, so that the latter can be freely seated and fixed, which leads to a uniform positioning of the tire blank.

Further specific features of the present invention will be described in detail subsequently.

DESCRIPTION OF PREFERRED EMBODIMENTS

Referring now to the drawings in detail, the pneumatic tire that is to be produced, and which predominantly involves a belted tire having a radial carcass that is anchored in the beads 1 by being looped around cores that are resistant to tension and compression, is vulcanized in a position in which the beads 1 are displaced laterally outwardly (the so-called trapezoidal position).

A vulcanizing mold, which in a vertical cross-sectional view has an essentially double-U shape, is used to form the outer surface of the tire blank, i.e. the tread surface 2 with a profile and the sidewall surfaces 3. As shown in FIG. 1, the vulcanizing mold is predominantly equipped with radially movable segments 4, which are provided with conventional profiling elements 5, a lower mold member 6, and an upper mold member 7. The vulcanizing apparatus is furthermore provided with retainer bands 8, 9 that surround and accommodate the upper and lower mold members 7, 6; the retainer bands 8, 9 are provided with channels 10 for conveying a heating medium. A ring 11, which is similarly provided with heating channels 10 as well as an inclined guide surface 12, serves to radially move the segments 4 inwardly.

Since in the finished state the tire that is to be vulcanized will have its beads 1 disposed on the radially inner periphery of a wheel rim, the sealing surfaces 13 that are to face the rim are disposed on the inner wall of the tire in the bead region; during vulcanization, these sealing surfaces 13 must be formed metallically smooth. Provided to accomplish this smooth forming of the sealing surfaces 13 are annular disk-shaped lower and upper contour rings 14 and 15 respectively. The remainder of the inner wall of the tire is formed in a conventional manner via a heating bag or bellows 16 to which a heating medium can be supplied and which during the vulcanization presses the tire blank against the outer mold parts 5, 6, and 7.

Figure 2:
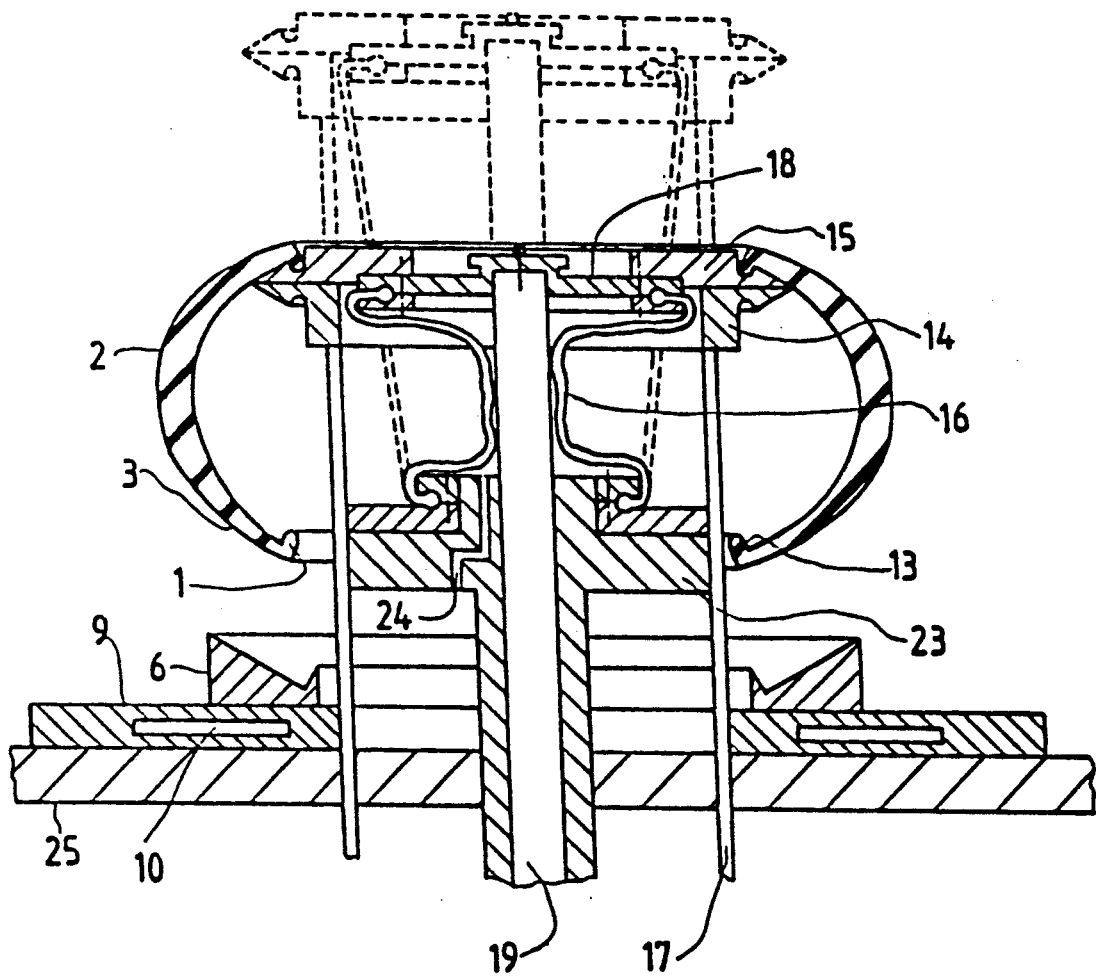
FIG. 2 is a cross-sectional view of the apparatus of FIG. 1, but in an opened state and with the contour rings moved together and out (the loading position)

In the embodiment illustrated in FIGS. 1 and 2, the lower contour ring 14 is secured at the left and at the right to two oppositely disposed guide rods 17 that can be move din a vertical direction via non-illustrated drive elements, such as hydraulic cylinders. It would also be possible to provide more than two rods 17 or two shell-like side walls as carriers for the lower contour ring 14. In contrast, the upper contour ring 15 is disposed on a retainer plate 18 that in turn is secured to the upper end of a piston rod 19 of a bellows stretching cylinder. The upper rim of the heating bellows 16 is also secured to the retainer plate 18, and in particular via a clamping ring 20. The lower rim of the hating bellows 16 is secured with the aid of clamping rings 21 and 22 that are disposed on a bladder or bellows head 23. At the upper rim of the heating bellows, the diameter, i.e. the opening of the heating bellows, is considerably greater than at the bottom. In addition, the bladder or bellows head 23 is provided with feed lines 24 via which the heating bellows 16 can be supplied with steam or can have a vacuum applied thereto. The vulcanizing apparatus is disposed on a press table 25.

Via one or more non-illustrated drive means, for example one or more hydraulic cylinders, the bladder or bellows head 23 can be moved vertically, as can be the piston rod 19. The drive means for the bladder or bellows head 23, the piston rod 19, and the guide rods 17 are coupled with one another in such a way that during movement of the bladder or bellows head 23, the piston rod 19 with the upper contour ring 15, and the guide rods 17 with the lower contour ring 14, are automatically moved along therewith. In addition, the piston rod 19 and the guide rods 17, of course, also can be moved separately from the bladder or bellows head 23 and relative thereto. The important thing for the operation of the inventive apparatus is that the lower contour ring 14 and the lower heating bellows clamping arrangement on the bladder or bellows head 23 be movable relative to one another, so that as the lower contour ring 14 moves against the upper contour ring 15, the heating bellows 16 can dip down through a space defined by the lower contour ring 14.

The operation of the apparatus of the present invention will be explained subsequently with the aid of FIGS. 1 and 2.

If the vulcanizing apparatus has not yet been warmed up, preheating is effected in a closed mold without a tire blank, with the bead contour rings 14, 15 being disposed in the heating position illustrated in FIG. 1. Thereafter, the vulcanizing mold is opened by raising the upper mold member 7, together with the upper retainer means 8, accompanied by the simultaneous radial moving apart of the segments 4.

Subsequently, the bladder or bellows head 23 is moved together with the two contour rings 14, 15 into its upper position (the dishing or curving position). Thereafter, the piston rod 19 of the bellows stretching cylinder, along with the upper contour ring 15, are moved separately further upwardly, thereby stretching the heating bellows 16 (the dashed-line position of FIG. 2). Either at the same time or thereafter, a vacuum is applied to the heating bellows 16, so that all wall portions of the bellows tend to be additionally displaced toward the middle, i.e. in the direction toward the piston rod 19. As a result, and due to the smaller diameter of the lower heating bellows opening, a subsequent raising of the lower contour ring 14 assures that the heating bellows 16 cannot become damaged. The movement of the lower contour ring 14 ends at or shortly before the upper contour ring 15. Thereafter, the upper contour ring 15 is lowered via the drive mechanism of the bellows stretching cylinder to the loading or charging height (the solid-line position in FIG. 2), whereby the lower contour ring 14 is pulled along.

In this loading position, the tire blank is placed over the contour rings 14, 15, accompanied by a slight oval deformation of the lower bead 1, with the upper bead 1 resting in a groove of the upper contour ring 15. The lower contour ring 14 is subsequently lowered into its lower position relative to the bladder or bellows head 23, whereby the beads 1 of the tire blank are fixed on the seating surfaces of the contour rings 14, 15.

In this position, the first curving pressure stage is initiated, during which the heating bellows 16 is supplied with steam at approximately 0.3 to 0.4 bar. Since in this stage the lower contour ring 14 is still disposed above its vulcanizing position, a free placement of the beads 1 of the tire blank upon the contour rings 14, 15 is possible, i.e. the free bending or stretching of the tire blank is not obstructed by any outer components of the vulcanizing mold, so that after the vulcanization tires having more favorable manufacturing tolerances result.

Subsequently, the bladder or bellows head 23, together with the two contour rings 14, 15 and the tire blank fixed thereon, are lowered into the heating position, with the lower sidewall surface 3 of the tire blank resting against the lower mold member 6. The vulcanizing mold is thereafter closed with the retainer band 8, the mold member 7, the ring 11, and the segments 4 by lowering the upper mold parts, and the blank is finished-vulcanized by supplying a heating medium in the heating bellows 16 and in the channels 10.

At the conclusion of the heating process, a vacuum is again applied to the heating bellows 16, and the heating mold is opened. The bladder or bellows head 23, together with the two contour rings and the vulcanized tire that is disposed thereon, is raised into the end position of the bladder or bellows head. The upper and lower contour rings are thereafter raised, with the lower contour ring 14 being raised as fast as or faster than the upper contour ring 15. During this movement, a simultaneous stretching of the heating bellows 16 is effected, and it is also possible to carry out a pressurizing to atmospheric pressure. Finally, the upper contour ring 15, which carries along the lower contour ring 14, is lowered into the discharge position, and the finished tire is removed. Although the tire can be removed from the front, removal is preferably effected from behind.

After the two contour rings 14, 15 have been lowered into their loading position, loading can again be effected. It should be noted that the apparatus can also be operated in such a manner that the discharge position and the loading position for the contour rings 14, 15 are the same. From the previously described method, it is clear that the piston rod 19 of the bellows stretching cylinder is movable in the illustrated embodiment into specific positions, in particular positions for bellows stretching, heating, molding, and vulcanizing, whereas the bladder or bellows head 23 and the guide rods 17 are movable only into their end positions. In this connection, the lower position of the bladder or bellows head 23 corresponds to the heating position, while the upper position corresponds to the molding position and the bellows replacement position.

Figure 3:
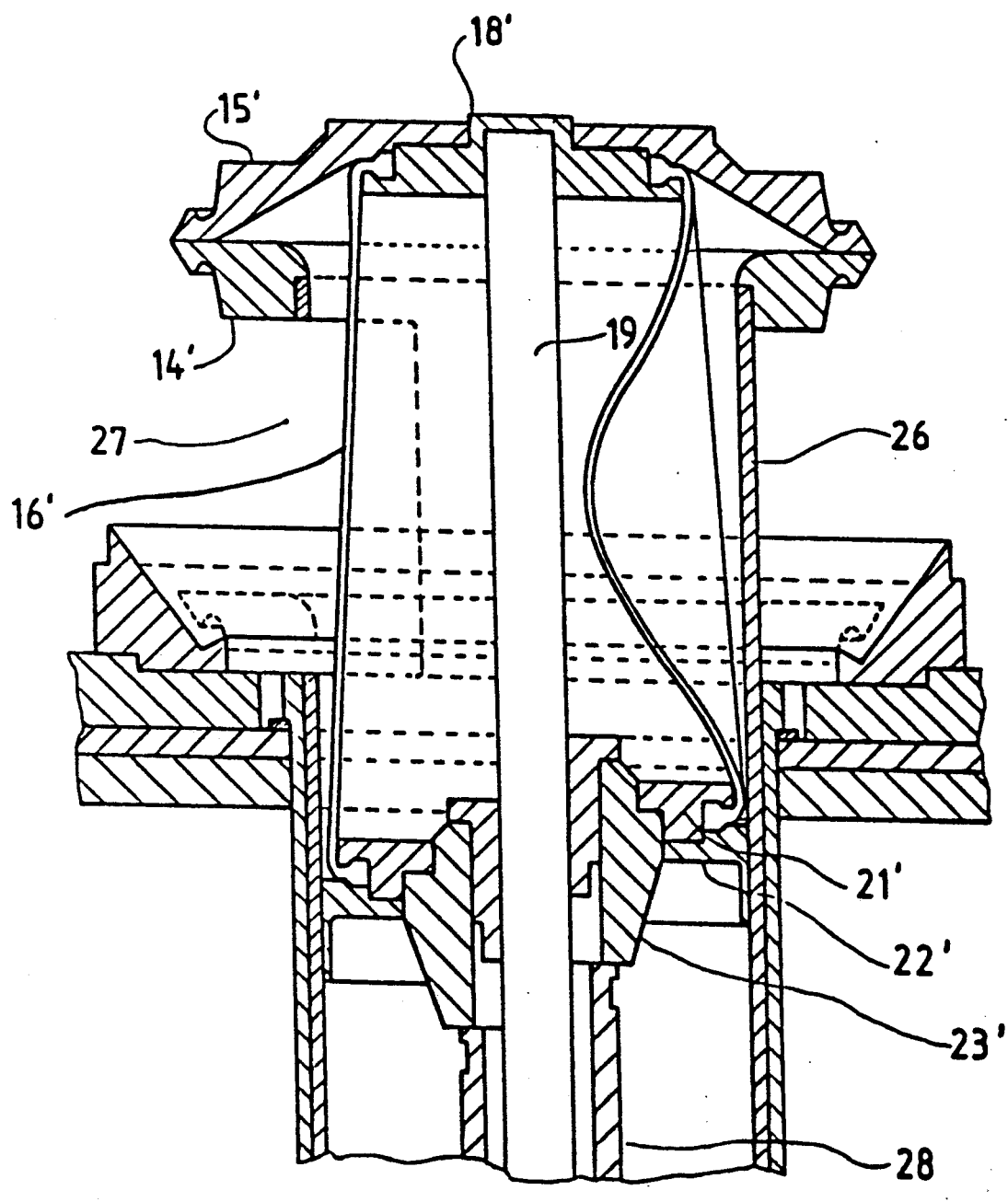
FIG. 3 is a vertical cross-sectional view through a slightly modified embodiment of the inventive vulcanizing apparatus, with the left side illustrating the loading position.

The embodiment of the vulcanizing apparatus illustrated in FIG. 3 differs from the embodiment of FIGS. 1 and 2 in several components as well as in the coupling of the drive means for the individual components. However the embodiment illustrated in FIG. 3 has the advantage that it can be fabricated by modifying conventional vulcanizing apparatus that are already present in a plant.

FIG. 3 is a vertical cross-sectional view through the apparatus, with the front side (the loading side) being disposed on the left. The outer upper portion of the vulcanizing mold can correspond to that of FIG. 1, and was left out in order to facilitate illustration. For the metallically smooth molding of bead seating surfaces in a trapezoidal heating position, the apparatus is again provided with a lower contour ring 14' and an upper contour ring 15'. Similarly, a heating bellows 16' is provided to which can be supplied a heating medium and to which a vacuum can be applied. The lower contour ring 14' is secured to the upper edge of a movable shaft barrel 26 that is provided at least on the front side with an introduction opening, in the form of a window 27, for the lower bead of a tire blank. The upper contour ring 15' is again disposed on a retainer plate 18', which in turn is secured to the upper end of a piston rod 19' of a bellows stretching cylinder. The upper rim of the heating bellows 16' is clamped between the retainer plate 18' and the upper contour ring 15'. Clamping of the lower rim of the heating bellows is effected by the rings 21' and 22', which are disposed on a bladder or bellows head 23' that can be moved by an arbor 28. Although in the illustrated embodiment a greater diameter is selected for the opening of the upper rim of the heating bellows than for the lower rim thereof, if necessary the reverse conditions could also be present.

The bellows stretching cylinder with the piston rod 19 is secured to the arbor 28. By means of a non-illustrated bearing or stop mechanism, the movement paths of the piston rod 19 can be varied, since the bellows stretching cylinder is predominantly movable into only its end positions. The coordination of the movements of this embodiment differs from that of the first embodiment in that now when the shaft barrel 26 moves, the bellows stretching cylinder along with the piston rod 19 and the upper contour ring 15', as well as the bladder or bellows head 23', are also moved.

To load the apparatus, the shaft barrel 26 is moved upwardly along with the lower contour ring 14', so that the lower contour ring rests against the upper contour ring. During the movement of the shaft barrel 26 it is important that, in order to avoid damage to the heating bellows 16', the latter be completely stretched and have vacuum applied thereto, or at least not be pressurized. A tire blank is placed in the previously described manner over the contour rings accompanied by slight oval deformation of the lower bead, with the window 27 assuring that the shaft barrel 26 is not in the way. In contrast to the first embodiment, however, the fixing of the tire blank and the initiation of the first dishing or curving stage is then effected by moving the upper contour ring 15' and the bladder or bellows head 23' upwardly. The shaft barrel 26 along with the lower contour ring 14' are subsequently moved into the vulcanizing position, with the upper contour ring 15', the heating bellows 16', and the fixed tire blank being moved along therewith. The heating position of the lower contour ring 14' is indicated by dashed lines in FIG. 3. After the vulcanizing mold has been closed, the tire blank is vulcanized in a conventional manner. After vulcanization is concluded and the tire has been moved up into its discharge position, the finished tire can be removed from the front. However, it is also expedient to provide a window on the back side of the shaft barrel 26, so that it would also be possible to remove a finished tire from the rear.

The present invention is, of course, in no way restricted to the specific disclosure of the specification and drawings, but also encompasses any modifications within the scope of the appended claims.

What we claim is:

1. In an apparatus for vulcanizing a pneumatic vehicle tire, the tire beads of which, in a mounted state, are disposed on the radially inner periphery of a wheel rim, and including, for vulcanizing a raw tire blank, with the tire beads being displaced laterally outwardly, a heating press that is provided with tire tread and sidewall mold parts for the outer areas of said tire blanks, two axially displaceable contour rings to form the inner regions of said tire beads, and a heating bellows, the improvement in combination therewith wherein:

said contour rings include an upper contour ring and a lower contour ring which can be moved into a loading position above a vulcanization position, in which said upper and lower contour rings are positioned adjacent to one another, to provide adequate space for mounting of a green tire relative thereto, said lower contour ring having an annular disk-like configuration;

upper heating bellows clamping means and lower heating bellows clamping means, said upper heating bellows clamping means comprising a retaining plate secured to an upper end of an axially movable piston rod, and with said upper contour ring being connected to said retaining plate;

an axially displaceable bellows head to which said lower heating bellows clamping means is connected, with said upper heating bellows clamping means being positioned above, said lower heating bellows clamping means at all times during operation to prevent folding and inversion of said heating bellows; and axially displaceable support means located radially outwardly of said upper and lower heating bellows clamping means to which said lower contour ring is secured, with said support means and said bellows head and said piston rod being arranged at a bottom portion of said mold parts and being displaceable relative to one another; with said piston rod as well as said support means, and said bellows head being operatively connected with one another so that said upper contour ring and said lower contour ring automatically are moved along with said bellows head with said piston rod being further movable independently from said bellows head from said loading position to an upper position for stretching said heating bellows and to said loading position which is below said upper position; and with said support means being further movable independently from said bellows head from said loading position to said upper position and from said upper position to said loading position by said upper contour ring.

2. An in combination according to claim 1, in which said movable piston rod, said bellows head, and said support means are coupled with one another in such a way that when said bellows head is shifted, said piston rod and said support means are moved along therewith.

3. An in combination according to claim 1, in which said movable piston rod, said bellows head, and said support means are coupled with one another in such a way that when said support means is shifted, said piston rod and said bellows head are moved along therewith.

4. An in combination according to claim 1, in which said support means is a barrel that surrounds said bellows head.

5. An in combination according to claim 4, in which said support means is a metallic barrel.

6. An in combination according to claim 4, in which at least a front side of said barrel is provided with a window-like opening.

7. An in combination according to claim 1, in which said support means comprises at least two support columns.

8. An in combination according to claim 1, in which said heating bellows defines an upper and a lower opening, with said upper opening having a diameter that is greater than the diameter of said lower opening.

9. An in combination according to claim 1, in which said heating bellows defines an upper and a lower opening, with said upper opening having a diameter that is smaller than the diameter of said lower opening.

* * * * *